United States Patent
Markandeya et al.

(10) Patent No.: US 12,304,866 B2
(45) Date of Patent: May 20, 2025

(54) 3D PRINTABLE PORTLAND LIMESTONE CLAY-BASED MORTAR UTILIZING LOCALLY AVAILABLE MATERIALS

(71) Applicant: Icon Technology, Inc., Austin, TX (US)

(72) Inventors: Ananya Markandeya, Austin, TX (US); Daniel Galvez Moreno, Austin, TX (US); Aida Margarita Ley Hernandez, Austin, TX (US); Kunal Kupwade-Patil, Austin, TX (US); Alexander Le Roux, Austin, TX (US)

(73) Assignee: ICON Technology, Inc., Austin, TX (US)

( * ) Notice: Subject to any disclaimer, the term of this patent is extended or adjusted under 35 U.S.C. 154(b) by 6 days.

(21) Appl. No.: 17/234,416

(22) Filed: Apr. 19, 2021

(65) Prior Publication Data

US 2022/0106230 A1    Apr. 7, 2022

Related U.S. Application Data (60) Provisional application No. 63/086,332, filed on Oct. 1, 2020.

(51) Int. Cl.
*C04B 28/04* (2006.01)
*B28B 1/00* (2006.01)
(Continued)

(52) U.S. Cl.
CPC .............. *C04B 28/04* (2013.01); *B28B 1/001* (2013.01); *B33Y 10/00* (2014.12); *B33Y 70/00* (2014.12);
(Continued)

(58) Field of Classification Search
CPC ....... C04B 28/04; C04B 14/06; C04B 14/104; C04B 14/106; C04B 14/28;
(Continued)

(56) References Cited

U.S. PATENT DOCUMENTS

| 1,521,967 | A | * | 1/1925 | Powers | .................... C04B 28/04 |
| | | | | | 106/738 |
| 2012/0055376 | A1 | * | 3/2012 | Herfort | ..................... C04B 7/13 |
| | | | | | 106/718 |

(Continued)

FOREIGN PATENT DOCUMENTS

WO    WO-2019030256 A1 *    2/2019    .......... B01F 27/1121

OTHER PUBLICATIONS

Singh et al. "Role of water/cement ratio on strength development of cement mortar", 2015. Journal of Building Engineering 4, p. 94-100. (Year: 2015).*

(Continued)

*Primary Examiner* — Coris Fung
*Assistant Examiner* — Catriona M Corallo
(74) *Attorney, Agent, or Firm* — KOKKA & BACKUS, PC (57) ABSTRACT

A 3D printable clay-based mortar cementitious ink includes a blend of commercially available Portland cement, calcium carbonate, sand, and calcined clay. The calcined clay is produced from the calcination of clay having a high kaolinite content of greater than about 60%. The clay is calcined at a temperature of between about 600° C. and about 800° C., preferably between about 650° C. and about 850° C., for a period of one to two hours. In a preferred embodiment, a ratio of calcined clay to Portland cement is about 0.148, a ratio of calcium carbonate to Portland cement is about 0.333, and a ratio of sand to Portland cement is approximately about 3.0. The ratio of water to powder (clay, cement, calcium carbonate, and sand) may range between 0.39 and 0.40.

15 Claims, 5 Drawing Sheets

(51) Int. Cl.
   *B33Y 10/00*     (2015.01)
   *B33Y 70/00*     (2020.01)
   *C04B 14/06*     (2006.01)
   *C04B 14/10*     (2006.01)
   *C04B 14/28*     (2006.01)
   *C04B 111/00*    (2006.01)

(52) U.S. Cl.
   CPC ............ *C04B 14/06* (2013.01); *C04B 14/104* (2013.01); *C04B 14/106* (2013.01); *C04B 14/28* (2013.01); *C04B 2111/00146* (2013.01); *C04B 2111/00181* (2013.01)

(58) Field of Classification Search
   CPC . C04B 2111/00146; C04B 2111/00181; B33Y 10/00; B33Y 70/00; B28B 1/001
   USPC ........................................................ 106/606
   See application file for complete search history.

(56) References Cited

U.S. PATENT DOCUMENTS

| | | | |
|---|---|---|---|
| 2013/0123392 A1 | 5/2013 | Guise et al. | |
| 2013/0231415 A1* | 9/2013 | Page | C08F 220/585 526/240 |
| 2019/0194072 A1 | 6/2019 | Esnault et al. | |

OTHER PUBLICATIONS

Alaka et al. "High volume fly ash concrete: The practical impact of using superabundant dose of high range water reducer". Journal of Building Engineering 8 (2016) p. 81-90. (Year: 2016).*
"Hydration Controlling Admixtures—Product Information Sheet". IRMCA, www.irmca.org (2016). (Year: 2016).*
International Search Report and Written Opinion issued to PCT/US2021/027966, dated Sep. 14, 2021, 10 pages.
Chen et al. "Effect of different grade levels of calcined clays on fresh and hardened properties of ternary-blended cementitious materials for 3D printing", Cement and Cement Composites, vol. 114, article 103708, Jul. 4, 2020, pp. 1-20.
"Mortar (Masonry)" Wikipedia, Sep. 14, 2020, p. 3-4, [retrieved Jun. 18, 2021 from https://en.wikipedia.org/w/index.php?title=Mortar_(masonry)&oldid=978303473>].
Chen et al., "Effect of different grade levels of calcined clays on fresh and hardened properties of ternary-blended cementitious materials for 3D printing," Cement and Cement Composites, vol. 114, Article 103708, dated Jul. 4, 2020 (pp. 1-20).
Rodriquez, Kari, Notification of Transmittal of the International Search Report and the Written Opinion of the International Searching Authority, or the Declaration, mailed Sep. 14, 2021 for International Application No. PCT/US2021/027966.
Wikipedia, "Mortar (masonry)," dated Sep. 17, 2021, retrieved from internet on Jun. 18, 2021 from https://en.wikipedia.org/w/index.php?title=Mortar_(masonry)&oldid=978303473.

* cited by examiner

3D PRINTABLE PORTLAND LIMESTONE CLAY-BASED MORTAR UTILIZING LOCALLY AVAILABLE MATERIALS

CROSS-REFERENCE TO PRIOR FILED APPLICATIONS

This application incorporates by reference and claims the benefit of priority to U.S. Provisional Application No. 63/086,332, filed on Oct. 1, 2020.

BACKGROUND

This disclosure is generally directed to three-dimensional (3D) printing of building structures. More particular, this disclosure is directed to a printable limestone clay-based mortar cementitious ink for use with a 3D printing system using cementitious and mortar mixtures.

Cement and other forms of concrete have played an integral role in the construction of any large scale buildings. In a typical use case, cement is initially mixed off-site (e.g., away from the construction project) and then transported via truck or other means to the construction site. Alternatively, cement may be mixed on-site and pumped up to a desired floor for delivery. Once at the site, the truck delivers, or pours, cement at a desired location. From there, skilled laborers smooth and shape the cement, and allow it to set or harden.

Three dimensional (3D) printing of cement using specialized equipment is an interesting and challenging new application employing the use of cement. In such 3D printing, specialized equipment is used to deposit a cement layer at a specific location using a degree of precision, oftentimes on top of a previously deposited cement layer. One problem with 3D printing of cement, or any pumping of cement for that matter, is the fluid mechanics associated with cement. Cement is typically a rather viscous fluid—difficult to pump across long distances of piping and/or through various piping structures, such as bends and nozzles, to reach the delivery location. Ambient temperature changes, and other environmental factors, can further affect the viscosity of cement, making pumping all the more difficult.

Mortar and cement are commonly used in the construction of structures. Cement is a fine powder of primarily hydraulic calcium silicates that hardens when water is added to form durable structures. Cement may also include limestone, clay, shells, and silica sand. Mortar typically includes lime, sand, and cement, and is typically used to hold building components, such as bricks, stones, and concrete blocks, together to form a structure. Portland cement is commonly used throughout the industry as a basic ingredient of concrete, mortar, and grout. It is produced by heating limestone and clay materials in a kiln to form a solid material, grinding the solid material, and adding gypsum.

While cement is commonly used in the construction of a wall or foundational structure, sourcing cement materials for large-scale projects can become costly, particularly if the materials are not readily available locally. The use of cement is also correlated with high emissions of greenhouse gases and other pollutants.

Accordingly, a need exists for a printable cementitious ink or mortar that is less expensive and more environmentally friendly than a conventional cement.

SUMMARY

To meet the needs noted above and others, the present disclosure provides a 3D printable clay-based mortar cementitious ink ("printable mortar") that achieves the target structural performance while reducing greenhouse gas emissions, while also utilizing source materials that are locally available. The printable mortar includes Type I/II Portland cement, calcined clay, ground calcium carbonate, sand, and liquid admixtures. In a preferred embodiment, the clay is calcined at a temperature of between about 600° C. and about 800° C., preferably between about 650° C. and about 850° C. The liquid admixtures include air-entraining admixture, high range superplasticizer, and shrinkage reducing admixture.

Conventional 3D printing systems may implement a pumping system, whereby a fluid is required to pass through an extended line of pipe, over substantial lengths and through various gate types, bends, nozzles, and the like. The printable mortar needs to be fairly fluid, having a particular viscosity for the system piping and print head opening. Additive mixtures are used to adjust or modify the viscosity of the cement mixture before the cement mixture reaches the end of the line (e.g., the nozzle).

The printable mortar is then extruded from the nozzle as an elongated bead, layer by layer vertically upward to form the wall. The material properties of the printable mortar for 3D printing must be of the proper viscosity that has appropriate workability and rheological properties as it is pumped through the pipe and out of the print head opening. The cementitious ink must therefore not only have the proper viscosity, but also must have the appropriate dry ingredients that, when added to the aggregate (typically sand) takes on the appropriate slump loss during the appropriate timeframe.

It is important that the binder material added to the aggregate not only be chosen with the correct types of materials and the correct ratios and volumes, but also that appropriate supplementary cementitious materials (SCM) be utilized in the binder, with appropriate admixtures also applied to the binder either before or after mixing with the aggregate. If the appropriate materials and percentages thereof are chosen to achieve the appropriate slump loss for 3D printing, then it is further desirable that readily available fine sand or clay be added to that mix.

The presently disclosed 3D printable clay-based mortar includes a blend of commercially-available Type I/II Portland cement, ground calcium carbonate, calcined clay, and a silica sand. When the above-noted dry components are mixed with water at a specific ratio as well as with additional admixtures, the printable mortar is suitable for pumping, extrusion, and stacking of multiple layers using 3D printing.

The clay is produced from calcination of clay with high kaolinite content, preferably greater than 60%. In a preferred embodiment, the ratio of calcined clay to Portland cement is approximately 0.148, the ratio of limestone filler to Portland cement is approximately 0.333, and the ratio of sand to Portland cement is approximately 3.0. The ratio of water to powder (clay, cement, limestone, and sand) may range between approximately 0.35 and approximately 0.42. In the preferred embodiment, the 3D printable mortar includes the following liquid admixtures: a high range water reducer, a slump retention admixture, a shrinkage reducing admixture, a hydration stabilizer, and an air entraining agent.

In light of the disclosure herein, and without limiting the scope of the invention in any way, in a first aspect of the present disclosure, which may be combined with any other aspect listed herein unless specified otherwise, a 3D printable clay-based mortar includes Type I/II Portland cement, ground calcium carbonate, calcined clay, sand, limestone filler, and water.

In a second aspect of the present disclosure, which may be combined with any other aspect listed herein unless specified otherwise, the clay product is produced from the calcination of clay with high kaolinite content of greater than 60%.

In a third aspect of the present disclosure, which may be combined with any other aspect listed herein unless specified otherwise, the clay product is produced from the calcination of clay at a temperature of between about 600° C. and about 800° C., preferably between about 650° C. and about 850° C.

In a fourth aspect of the present disclosure, which may be combined with any other aspect listed herein unless specified otherwise, a ratio of calcined clay to Portland cement is approximately 0.148, a ratio of limestone filler to Portland cement is approximately 0.333, and a ratio of sand to Portland cement is approximately 3.0.

In a fifth aspect of the present disclosure, which may be combined with any other aspect listed herein unless specified otherwise, a ratio of sand to cement is 3.0.

In a sixth aspect of the present disclosure, which may be combined with any other aspect listed herein unless specified otherwise, the printable mortar includes the following liquid admixtures: a high range water reducer, a slump retention admixture, a shrinkage reducing admixture, a hydration stabilizer, and an air entraining agent.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE FIGURES

Understanding that figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION

Certain embodiments described herein relate generally to the field of 3D printing systems for printing clay-based mortar cementitious ink ("printable mortar"). The printable mortar described herein has particular fluid parameters such as a certain viscosity and setting time that allow for 3D printing. Additionally, the printable mortar differs from traditional cementitious ink in that the printable mortar includes calcined clay and reduces the amount of Portland cement as compared to a traditional cementitious ink.

Conventional 3D printing systems may implement a pumping system, whereby a fluid is required to pass through an extended line of pipe, over substantial lengths and through various gate types, bends, nozzles, and the like. The cement mixture or printable mortar needs to be sufficiently fluid, having a particular viscosity to allow for movement through the system. Additives may be used to adjust or modify the viscosity of the cement or mortar mixture before the mixture reaches the end of the line (e.g., the nozzle). The mixture is then extruded from the nozzle as an elongated bead, layer by layer vertically upward to form the wall. The mixture must therefore have the proper slump loss so that when it is extruded from the nozzle of an elongated bead, layer by layer vertically upper to form the wall, the bead maintains its appropriate thickness and does not unduly slump. Any slump loss exceeding a certain limit or if slump loss is unduly retained, the mixture that is extruded will no longer be appropriately extruded or thereby printed on the bricks, etc. in a 3D fashion. The material properties of the cement or mortar mixture for three-dimensional printing must be of the proper viscosity and can include different dry ingredients such as Portland cement, fly ash, limestone fines, silica fume, sand, gravel mixed with water, and other fluid or liquid-based material.

Figure 1:
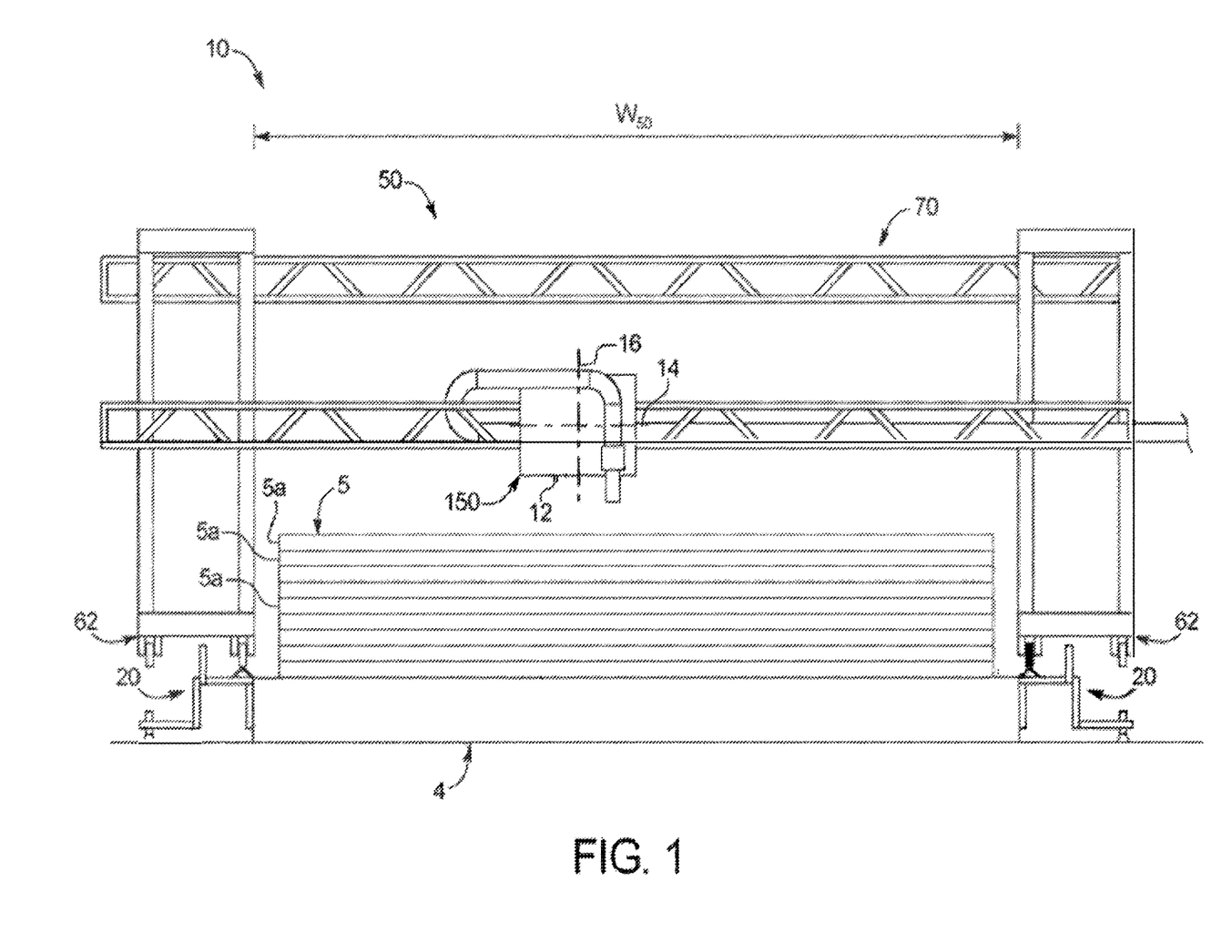
FIG. 1 is a system diagram of a first 3D printing system for printing the printable mortar, according to an example embodiment of the present disclosure.

Referring now to FIG. 1, an exemplary construction system 10 is shown. In this embodiment, the construction system 10 generally includes a pair of rail assemblies 20, a gantry 50 movably disposed on rail assemblies 20, and a printing assembly 150 movably disposed on gantry 50. The construction system 10 is configured to form a structure 5 (such as for example a personal dwelling) via additive manufacturing, specifically 3D printing, on a foundation 4. In particular, construction system 10 (via rail assemblies 20 and gantry 50) is configured to controllably move or actuate printing assembly 150 relative to the foundation 4 along each of a plurality of orthogonal movement axes or directions 12, 14, 16 such that printing assembly 150 may controllably deposit an extrudable building material in a plurality of vertically stacked layers 5a to form structure 5.

Construction system 10 effectuates the construction of a wall structure 5 by passing the printing assembly 150 above a wall structure and emitting extruded building material from a nozzle comprising an outlet. Accordingly, as printing assembly 150 moves in three possible orthogonal axis, as well as angles therebetween, the outlet emits extruded building material onto the upper surface 5a of the wall structure 5 as it is being formed. The wall structure is formed layer-by-layer by laying down an elongated bead of cementitious or mortar material of cement or concrete beginning with the first layer on ground or a pre-existing foundation 4. As each layer of elongated beads are laid down onto the foundation 4 or onto a previous layer, a plurality of stacked elongated beads of extruded building material additively, and three dimensions, form a building structure 5. The printing assembly 150 may shut off flow of extruded material in order to switch cementitious or mortar inks and/or nozzles printing different cementitious or mortar inks.

The presently disclosed 3D printable clay-based mortar includes a blend of commercially available Type I/II Portland cement, calcined clay, ground calcium carbonate (limestone), and sand. When the above-noted dry components are mixed with water at a specific ratio noted below as well as with additional admixtures, the printable mortar is suitable for pumping, extrusion, and stacking of multiple layers using 3D printing.

The printable mortar differs from traditional cementitious inks in that the mortar includes approximately less Portland cement than the cementitious ink, in some cases as much as about 30 to 35% by weight less cement. In one embodiment, the printable mortar includes calcined clay in lieu of the volume of reduced Portland cement. The clay component is produced from the calcination of clay having a high kaolinite content of greater than about 60%. The calcined clay may be made from a clay having a high kaolinite content, a high illite content, and/or a high montmorillonite content. The clay is calcined at a temperature of between about 600° C. and about 800° C., preferably between about 650° C. and about 850° C., for a period of one to two hours.

Calcined clay provides a number of advantages to the printable mortar. Calcined clay improves shape retention and stacking of layers at relative shorter times. The printable mortar has a relatively high "green strength," referring to the ability to extrude well coming out of the nozzle and the ability to stack layers while the printable mortar is relatively plastic. A high green strength corresponds to better interlayer adhesion. The printable mortar can accommodate shorter lift times with high initial fluidity, allowing for the structure to be built more quickly.

The calcined clay also reacts with water, calcium hydroxide (from cement hydration), and calcium carbonate in the long term, contributing to the strength and impermeability of the final structure. In conventional construction techniques, concrete is poured into formworks that remain assembled for several days until the concrete gains sufficient strength to withstand loads. Formworks allow for the relative humidity in the concrete to remain sufficiently high, which allows the cement hydration reaction to continue. Without the use of formworks and with the exposed high surface area of the elongated bead produced via 3D printing, the enhanced mechanical properties resulting from the synergistic effect of the Portland cement, the calcined clay, and the calcium carbonate compensate for the lack of concealment provided by the formworks in traditional construction techniques.

The aggregate used in the presently disclosed 3D printable clay-based mortar may include both coarse and fine sand ranging in size. In some embodiments, the aggregate includes crushed stone instead of or in addition to sand. Sand is readily available locally and at a lower cost, and results in a smooth wall surface that requires less treatment and preparation compared to a typical concrete wall.

The printable mortar also includes supplementary cementitious material (SCM) to control the workability of the mortar. SCM provides a number of advantages to the printable mortar, such as improvement in shape retention and in speed in stacking of layers. SCM in the binder at the appropriate percentage relative to Portland cement, in addition to fine sized clay in the aggregate, when mixed with water reacts with water and therefore contributes to the strength and impermeability of the final structure. The dry components, such as cement and SCM, constitute the binder material of the printable mortar. The binder material reacts with the aggregate, which comprises both coarse and fine sized sand, to form printable mortar if relative percentages of cement to SCM in the binder and fine and coarse sand in the aggregate are followed.

The dry components, such as the cement, the calcium carbonate (limestone), and the calcined clay are the binder material of the printable mortar. In some embodiments, the binder materials comprise at least about 20% to about 35% of the 3D printable clay-based mortar by weight. In some embodiments, the binder materials comprise about 30% of the 3D printable clay-based mortar by weight. Using less Type I/II Portland cement than a conventional cement material allows for the binder to include materials that are locally available to the construction site. Other locally available materials such as sands, clays, other limestone fillers (calcium carbonate), fly ash, bottom ash, metakaolin, ground granulated blast furnace slag (GGBFS), rice husk ash, biomass ash (i.e., from burnt wood or timber), volcanic ash, silica fume, soils, local soils, incinerator ash or municipal solid waste incinerator (MSWI) ash, shale quarry dust, ground natural aluminosilicate rock, and other types of clay, may also be used as desired.

In some embodiments, the ratio of calcined clay to Portland cement may range between about 0.1 and about 0.2, the ratio of calcium carbonate to Portland cement may range between about 0.2 and about 0.4, and the ratio of sand to Portland cement may range between about 2.8 and about 3.2. In a preferred embodiment, a ratio of calcined clay to Portland cement is 0.148, a ratio of calcium carbonate to Portland cement is 0.333, and a ratio of sand to Portland cement is approximately 3.0. This type of binder system can produce a dense microstructure that has a lower environmental impact in comparison to conventional concrete. The dense microstructure results from the addition of calcium carbonate in the hydration of the calcined clay.

In place of typical limestone, the printable mortar may include a blend of limestone and marble dust. The combination of calcined clay and fine limestone also improves the "green strength," stacking layers during the plastic stage. The reaction of the binder system is controlled by the addition of chemical admixtures that delay the initial setting of the mix, increasing the open time where more layers can be added without cold joints despite the elevated ambient temperatures.

The components also had a ratio of water to powder (clay, cement, limestone, and sand) may range between about 0.35 and about 0.42, and is preferably between about 0.39 and about 0.40.

In the preferred embodiment, the 3D printable mortar included the following liquid admixtures: a high range water reducer, a slump retention admixture, a shrinkage reducing admixture, a hydration stabilizer, and an air entraining agent.

The performance of the printable mortar of the present application has been evaluated according to the attributes listed in Table 1 in order to demonstrate the print quality of the printable mortar for industrial-scale use as well as printing filaments on a laboratory scale printer.

TABLE 1

Testing Matrix

| Attribute | Mini-Slump | Static Yield Stress using Rheometer | Bond Strength |
|---|---|---|---|
| Pumpability | X | | |
| Extrusion Quality | | X | |
| Buildability | X | X | |
| Layer Adhesion | | X | X |

The print performance of the printable mortar was evaluated according to the attributes listed in Table 1. The printable mortar was evaluated using a lab scale version of the Vulcan 3D printer. The mini-slump cone test was conducted on a sample from the mixer for evaluating pumpability. Samples extruded from the lab printer were evaluated for self-stability and buildability by measuring static yield stress using an ICAR rheometer. Six layers of the printable mortar were printed within five-minute lift times. Layer adhesive was evaluated using the pull off test conducted on the printed specimen after seven days of curing in ambient conditions. For further validation of mix design, compressive strength of the mix was determined at seven days.

The hydration of the printable mortar was tracked using isothermal calorimetry to evaluate two aspects. First, the hydration was tracked to evaluate the influence of calcium carbonate and calcined clay inclusion on early age hydration relative to a control mixture, with the binder fraction consisting only of Type I/II Portland cement. Second, the hydration was tracked to evaluate shifts in aluminate peak on the rate of heat release curve relative to control mix.

Figure 2:
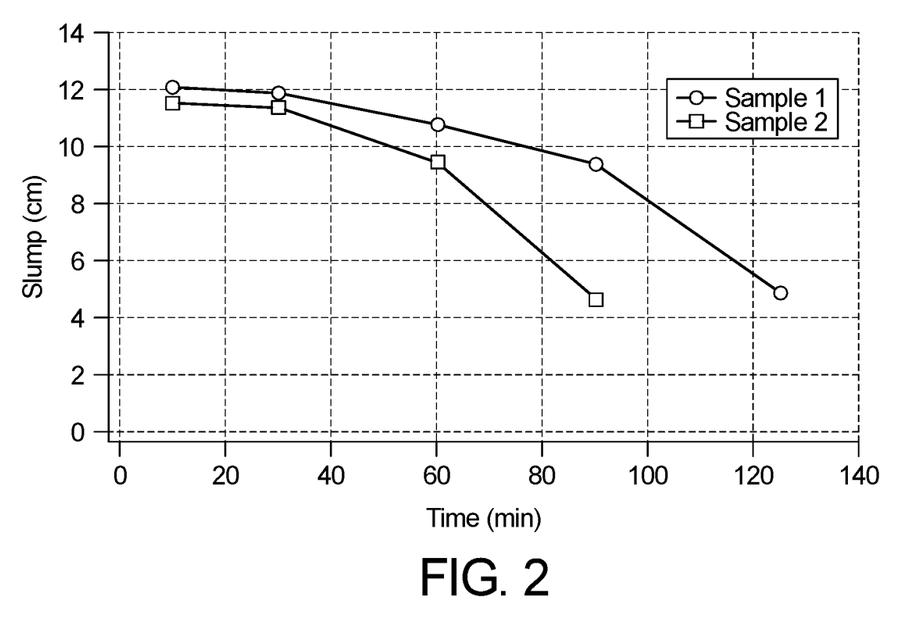
FIG. 2 is a graph demonstrating slump loss analysis of the printable mortar according to the present application.

FIG. 2 illustrates the slump loss analysis for two samples of the printable mortar. The pumpability of a printable mortar is likely to be a function of rheological properties of the mix: dynamic yield stress and plastic viscosity. As known to those skilled in the art, slump testing measure the consistency of fresh concrete or cement before it sets. It is performed to check the workability of the freshly made cement, and therefore the ease with which concrete or cement flows. The slump cone test is a standardized procedure conducted for evaluating the mix consistency and to check the workability of the freshly made mortar. The slump value correlates with the dynamic yield stress of the material. A scaled version of the Abrams cone served as the slump cone for this purpose. The mini-slump cone had a height of 15 cm and had a top and bottom diameter of 5 and 10 cm respectively. The use of slump value using the Abrams cone or slump flow (using Hagerman cone) for evaluation of pumpability is not typical for digital casting of concrete.

To ensure pumpability of the mortar, the mortar demonstrated an adequate slump retention for a 30-60 minute window in order to provide sufficient workability for pumping the mortar through 130 ft (40 m) from mixer to the nozzle for extrusion. This approach allows for operational contingencies, which might cause interruptions in pumping operation. Referring to FIG. 2, a drop in slump value of 10.8 cm and 9.45 cm at 60 and 90 minutes, respectively, was observed for Sample 1. For Sample 2, the drop in slump value of 9.45 cm and 4.9 cm at 60 min and 90 min was observed. The slump drop trend in FIG. 2 suggests that a sufficient length of time correlates with loss of workability as well as provides an indicator of an increase in static yield stress of the material.

Figure 3:
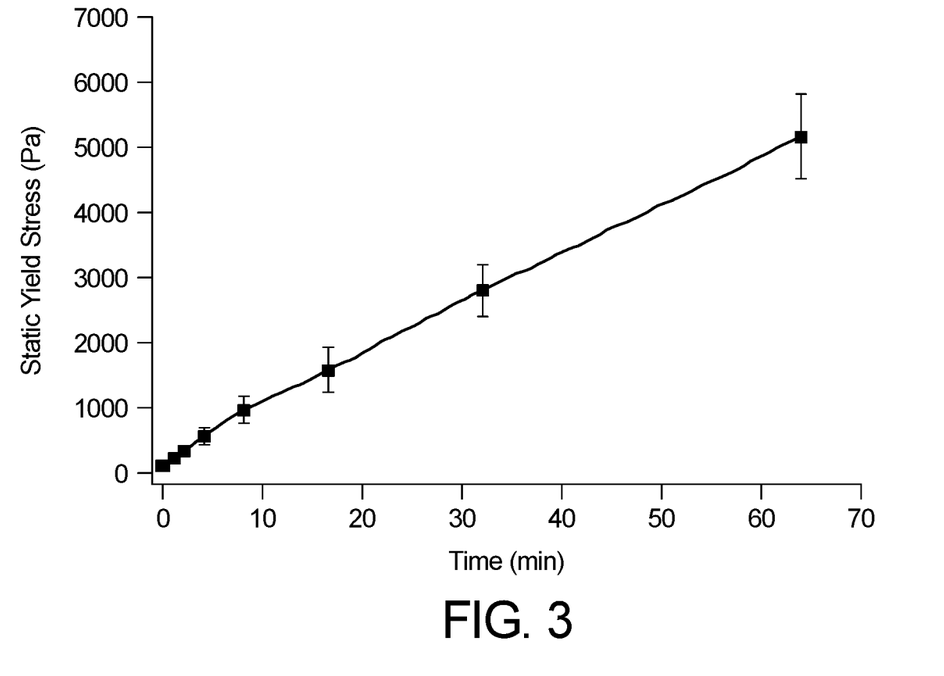
FIG. 3 is a graph demonstrating static yield stress of the printable mortar according to the present application.

FIG. 3 shows that the average static yield stress evolution over time. The static yield stress is determined by recording the torque required to rotate a cross-shaped impeller at 0.005 rps in a sample of printable mortar. The impeller rotation imposes a constantly increasing stress in the material up to the yielding point, which is right before the onset of flow. The maximum torque recorded is then transformed into stress units considering the dimensions of the impeller. The static yield stress is directly related to the capacity of the mix to bear load and preserve its shape after placing subsequent layers on top.

Referring to FIG. 3, the vertical bars indicate the 95% confidence intervals where the overall mean values calculated from data collected from four different batches are located. The time axis is relative to the first static yield stress test, which started approximately 15 minutes after the initial contact of water with the cementitious materials. The subject mix design formulation gains strength at a rate of 77.8 Pa/min at 35° C. during the first 64 minutes allowing the user to print layers relatively fast without the inclusion of accelerant admixtures. Since the calcined clay used is finer than cement, it enhances the flocculation rate of the solid particles once flow is ceased. Therefore, the calcined clay has an important contribution to the buildability of the material.

Figure 4:
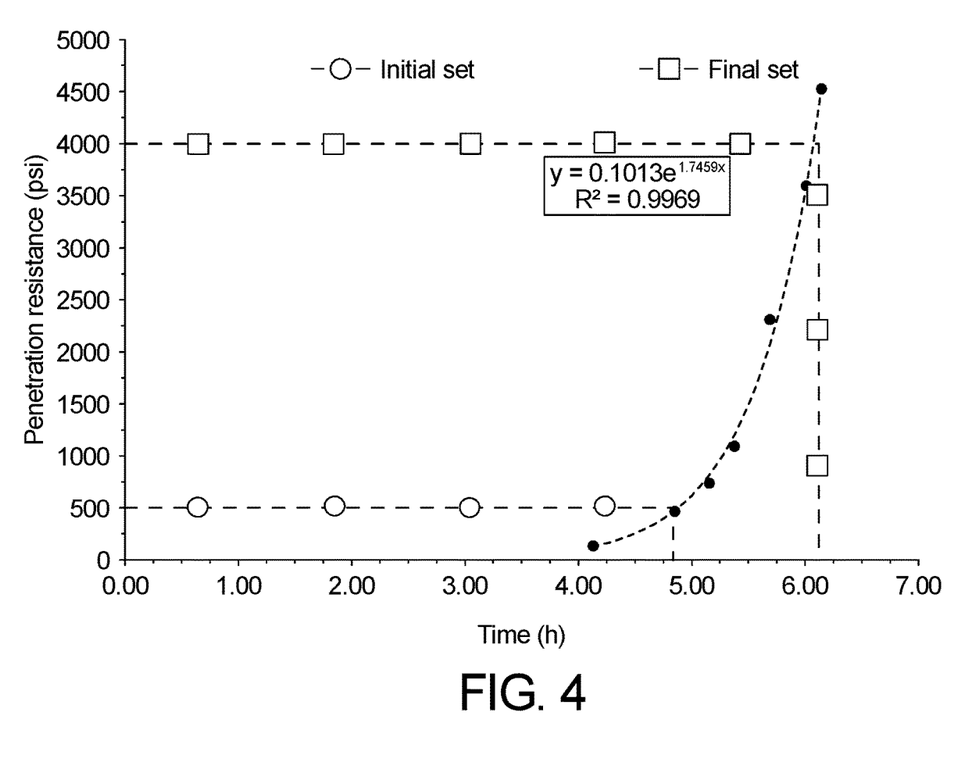
FIG. 4 is a graph demonstrating the results of a setting time test of the printable mortar according to the present application.

FIG. 4 illustrates the setting time test measured via penetration resistance. The setting time of concrete mixtures can be measured using the standard method ASTM C403, which consists of tracking the penetration resistance of a sample of mortar over time. The ASTM C403 defines the initial and final setting as the time needed to reach 500 and 4000 psi of penetration resistance, respectively. FIG. 4 shows that mixture starts to transition from soft to hard at approximately 4.9 hours (initial setting) from the time of contact of water and the cementitious materials and the process is completed after 1.3 hours from the initial setting (final setting). The special formulation of the subject mix delays the initial setting for 4.9 hours without compromising buildability, which is of particular benefit for the developing the bond strength between layers.

The relatively large surface area and slow dissolution rates of the calcined clay and calcium carbonate facilitate the nucleation and subsequent growth of the hydration products of cement leading to shorter transition from initial to final setting when compared with a simple Portland cement cementitious system. The presence of calcined clay and calcium carbonate in the cementitious system contributes to the wearing off effect of retarder and faster development of the mechanical strength.

Figure 5A:
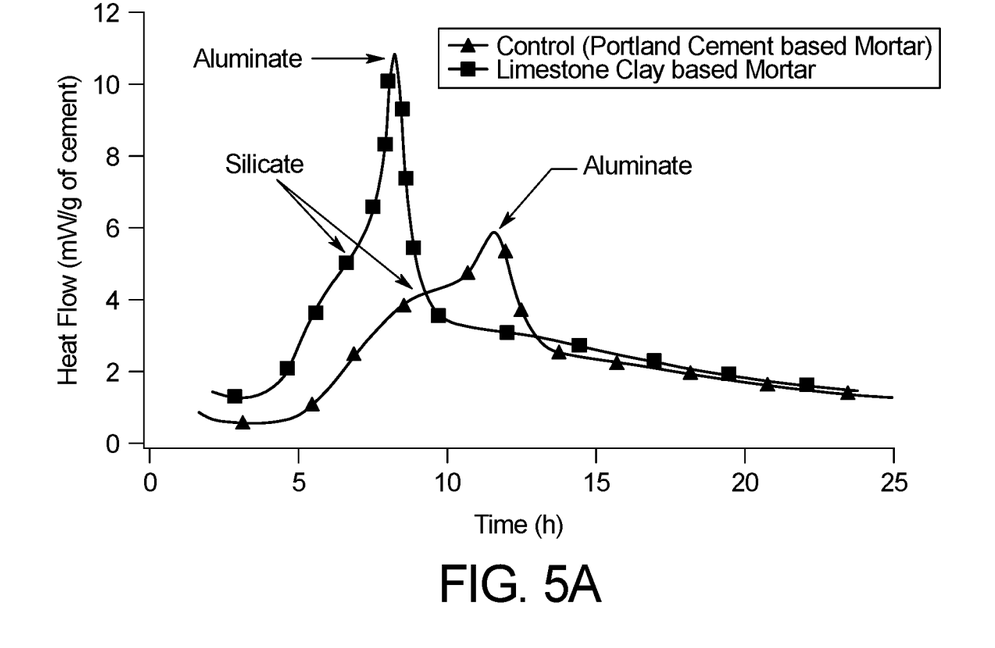
FIGS. 5A and 5B are graphs demonstrating the heat flow and the cumulative heat released profiles as a function of time of the printable mortar according to the present application and a control mortar.
Figure 5B:
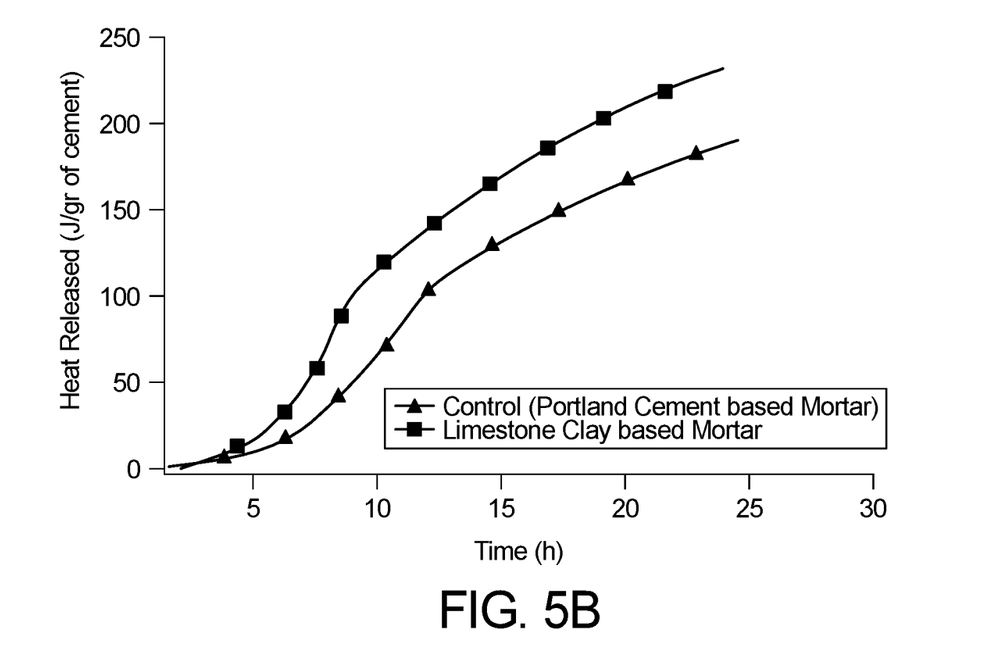

FIGS. 5A and 5B illustrate the isothermal calorimetric studies for the printable mortar and a control Portland cement based mortar. An isothermal calorimeter was used to measure the early age heat of hydration of the sample. When the cement is in contact with water, a rapid reaction starts and is characterized by a large heat release, then the rate of the overall reaction decreases (induction period) followed by acceleration and deceleration periods. The calorimeter measures the heat associated with the overall hydration reaction at a constant temperature.

After the mortar was mixed, a sample of approximately 8 g was collected and placed in a sealed vial and then loaded into the calorimeter. The sample was monitored for 24 hours at a constant temperature of 32.5° C. FIGS. 5A and 5B illustrate the heat flow and the cumulative heat released profiles normalized per gram of cement for limestone clay-based mortar and control systems as a function of time. Results show a shorter induction period for the limestone clay-based mortar compared to the control mixture, which indicates a higher reactivity. As well as an increase in slope of the acceleration period and a stronger and earlier aluminate peak. The acceleration of the reaction is related to the additional specific surface area provided by the mineral additions (calcined clay and calcium carbonate) that increases the nucleation sites for a faster precipitation of the hydration products that contributes to the evolution of mechanical strength.

Table 2 below shows a summary of the pull-off testing of the printed mortar. The pull off test on the 3D printed sample was performed as per ASTM C 1583, which consists of applying a tensile stress to a 50 mm steel disc bonded with epoxy glue to the top of a partially cored surface of a stack of 3D-printed layers. The core is drilled 10 mm below the interface located between the top and the subsequent layer. The pull off apparatus is engaged to the steel disc and the tensile stress is increased at 5 psi/s until the tensile strength of concrete is exceeded or the bond strength in between layers is surpassed. The objective of this test is to verify that the tensile strength of the layer-to-layer interface is comparable to the tensile strength of the bulk concrete. The proportioning of the subject mixture balances the rapid static yield stress evolution with the retardation of the hydration reaction to limit the existence of cold joints.

Table 2 shows that the measured average tensile stress is 143 PSI with a standard deviation of 25 PSI at 7 days of age. The failure planes developed at the substrate or the bulk of the top layer, except for one test that failed at the interface of both layers. However, the tensile stress recorded is within the same range of the tensile stress of the other tests performed suggesting that the layers are in fact bonded properly.

TABLE 2

Summary of pull-off testing on printed specimen

| Sample | Area (in.$^2$) | Tensile Strength (PSI) | Failure Location |
|---|---|---|---|
| 1 | 2.27 | 122 | Substrate |
| 2 | 2.27 | 152 | Interface |
| 3 | 2.27 | 173 | Substrate |
| 4 | 2.27 | 123 | Top Layer |
| Average | | 143 | |
| Standard deviation | | 25 | |

Figure 6A:
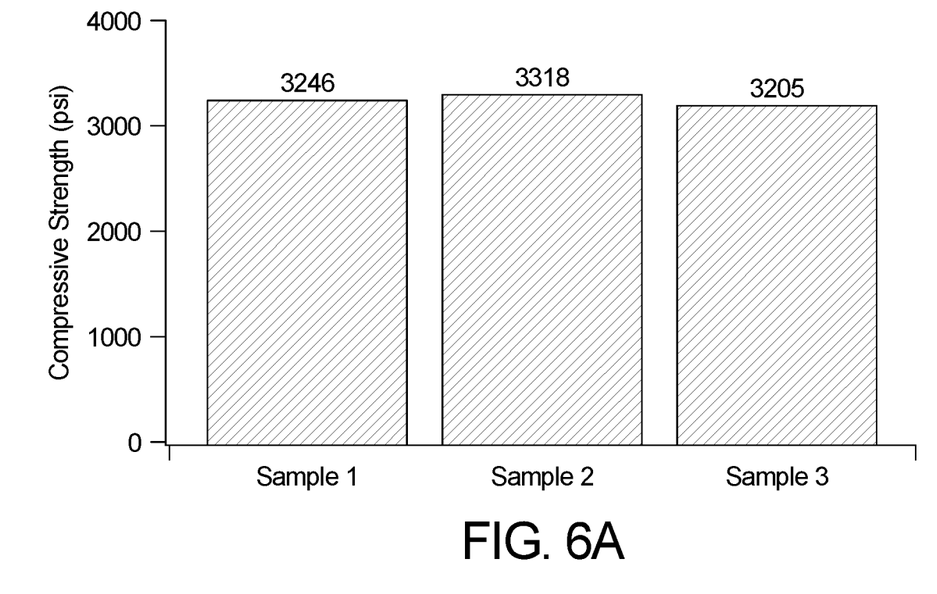
FIGS. 6A and 6B are graphs demonstrating the compressive strength of the printable mortar according to the present application.
Figure 6B:
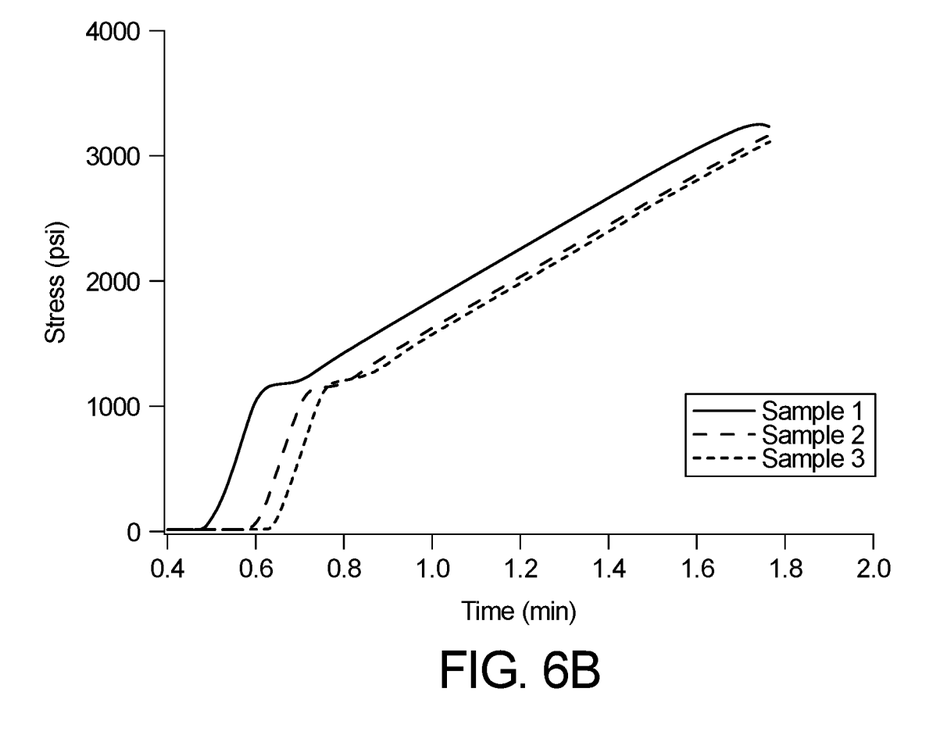

FIGS. 6A and 6B illustrate compressive strength of the printable mortar. Compressive strength of the mixture for two batches was determined at 7 days according to ASTM C39. Testing was conducted on 4 in.×8 in. specimens cast during printing. Compressive strength after 7 days is shown in FIG. 6A and stress vs time is shown FIG. 7B. The 28-day threshold of 3000 psi was met at 7 days for both batches. Enhanced hydration due to the introduction of calcined clay facilitated higher densification leading to higher strength formation. The strengths obtained with this mix design are in the allowable design range which can be used for 3D concrete printing.

As used in this specification, including the claims, the term "and/or" is a conjunction that is either inclusive or exclusive. Accordingly, the term "and/or" either signifies the presence of two or more things in a group or signifies that one selection may be made from a group of alternatives.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

We claim:

1. A three-dimensional (3D) printable clay-based mortar consisting of:
   Portland cement;
   calcium carbonate;
   sand;
   calcined clay; and
   at least a portion of an air-entraining admixture, a high range water reducer, a slump retention admixture, a shrinkage reducing admixture, and a hydration stabilizer,
   wherein the combination of calcined clay and calcium carbonate increases nucleation sites and provides calcium hydroxide to enhance mechanical strength of a structure.

2. The 3D printable clay-based mortar of claim 1, wherein the calcined clay is produced from a calcination of clay having a kaolinite content of greater than about 60% composition of the clay as a function of one or more of weight, mass, and volume.

3. The 3D printable clay-based mortar of claim 1, wherein the calcined clay is produced from the calcination of clay having an illite content and/or a montmorillonite content as a function of one or more of weight, mass, and volume.

4. The 3D printable clay-based mortar of claim 1, wherein the clay-based mortar has a ratio of calcined clay to Portland cement between about 0.1 and about 0.2, the ratio being a function of one or more of weight, mass, and volume.

5. The 3D printable clay-based mortar of claim 4, wherein the clay-based mortar has a ratio of calcined clay to Portland cement of about 0.148, the ratio being a function of one or more of weight, mass, and volume.

6. The 3D printable clay-based mortar of claim 1, wherein the clay-based mortar has a ratio of calcium carbonate to Portland cement between about 0.2 and about 0.4, the ratio being a function of one or more of weight, mass, and volume.

7. The 3D printable clay-based mortar of claim 6, wherein the clay-based mortar has a ratio of calcium carbonate to Portland cement of about 0.333, the ratio being a function of one or more of weight, mass, and volume.

8. The 3D printable clay-based mortar of claim 1, wherein the clay-based mortar has a ratio of sand to Portland cement of between about 2.8 and about 3.2, the ratio being a function of one or more of weight, mass, and volume.

9. The 3D printable clay-based mortar of claim 8, wherein the clay-based mortar has a ratio of sand to Portland cement of about 3.0, the ratio being a function of one or more of weight, mass, and volume.

10. The 3D printable clay-based mortar of claim 1, wherein the clay-based mortar has a ratio of water to Portland cement, calcined clay, calcium carbonate, and sand of between about 0.35 and about 0.42, the ratio being a function of one or more of weight, mass, and volume.

11. The 3D printable clay-based mortar of claim 1, wherein the clay-based mortar demonstrates a slump loss of less than about 4 cm within the first 4 hours of setting.

12. The 3D printable clay-based mortar of claim 1, wherein the clay-based mortar demonstrates a static yield stress of between about 1,000 Pa and about 3,000 Pa from about 8 minutes to about 32 minutes of setting.

13. The 3D printable clay-based mortar of claim 1, wherein the Portland cement, calcium carbonate, and calcined clay comprise binder materials, and wherein the binder materials comprise at least about 20% to about 35% of the printable clay-based mortar by weight.

14. The 3D printable clay-based mortar of claim 1, wherein the clay-based mortar has an initial setting time of about 4.9 hours as determined by ASTM C403.

15. The 3D printable clay-based mortar of claim 1, wherein the clay-based mortar has a final setting time of about 1.3 hours from an initial setting time as determined by ASTM C403.

* * * * *